US009659218B1

(12) United States Patent
Shetty et al.

(10) Patent No.: US 9,659,218 B1
(45) Date of Patent: May 23, 2017

(54) PREDICTING VIDEO START TIMES FOR MAXIMIZING USER ENGAGEMENT

(71) Applicant: Google Inc., Mountain View, CA (US)

(72) Inventors: Sanketh Shetty, Sunnyvale, CA (US); Apostol Natsev, Sunnyvale, CA (US); Balakrishnan Varadarajan, Sunnyvale, CA (US); Tomas Izo, San Francisco, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 14/699,243

(22) Filed: Apr. 29, 2015

(51) Int. Cl.
| G06K 9/00 | (2006.01) |
| G06K 9/62 | (2006.01) |
| G06K 9/52 | (2006.01) |

(52) U.S. Cl.
CPC ............ *G06K 9/00711* (2013.01); *G06K 9/52* (2013.01); *G06K 9/6217* (2013.01); *G06K 2009/00738* (2013.01)

(58) Field of Classification Search
CPC .... G06K 9/00711; G06K 9/52; G06K 9/6217; G06K 2009/00738
See application file for complete search history.

(56) References Cited

U.S. PATENT DOCUMENTS

| 8,307,392 B2 | 11/2012 | Ahanger et al. | |
| 8,689,269 B2 | 4/2014 | Yellin et al. | |
| 8,891,858 B1* | 11/2014 | Preetham | G06K 9/6256 382/159 |
| 9,113,128 B1* | 8/2015 | Aliverti | H04N 9/79 |
| 9,165,255 B1* | 10/2015 | Shetty | G06N 7/005 |
| 9,247,225 B2* | 1/2016 | Yehezkel | H04N 21/251 |
| 2009/0145726 A1 | 6/2009 | Gibbon et al. | |
| 2009/0265737 A1 | 10/2009 | Issa et al. | |
| 2009/0314502 A1 | 12/2009 | Williams | |
| 2010/0067863 A1* | 3/2010 | Wang | G11B 27/034 386/279 |
| 2011/0010624 A1* | 1/2011 | Vanslette | G06F 3/0485 715/704 |
| 2012/0124456 A1* | 5/2012 | Perez | G06Q 30/02 715/200 |
| 2012/0324491 A1* | 12/2012 | Bathiche | H04H 60/33 725/10 |
| 2013/0156320 A1* | 6/2013 | Fredembach | G06K 9/46 382/190 |

(Continued)

OTHER PUBLICATIONS

Official Google Video Blog, "New Feature: Embed videos with a specific start point", http://googlevideo.blogspot.com/2006/08/new-feature-embed-videos-with-specific.html, Aug. 2, 2006, 3 pages.

*Primary Examiner* — Aaron W Carter
(74) *Attorney, Agent, or Firm* — Lowenstein Sandler LLP

(57) ABSTRACT

Implementations disclose predicting video start times for maximizing user engagement. A method includes applying a machine-learned model to audio-visual content features of segments of a target content item, the machine-learned model trained based on user interaction signals and audio-visual content features of a training set of content item segments, calculating, based on applying the machine-learned model, a salience score for each of the segments of the target content item, and selecting, based on the calculated salience scores, one of the segments of the target content item as a starting point for playback of the target content item.

22 Claims, 6 Drawing Sheets

(56) References Cited

U.S. PATENT DOCUMENTS

| | | | |
|---|---|---|---|
| 2013/0316324 A1* | 11/2013 | Hoffmann | G09B 7/00 434/362 |
| 2014/0086554 A1* | 3/2014 | Yehezkel | H04N 21/251 386/241 |
| 2014/0328570 A1* | 11/2014 | Cheng | G11B 27/10 386/241 |
| 2015/0082349 A1* | 3/2015 | Ishtiaq | H04N 21/23418 725/40 |
| 2016/0070962 A1* | 3/2016 | Shetty | G06K 9/00718 382/225 |

* cited by examiner

300

Extract a set of segments from one or more videos of a content sharing platform
310

Analyze user interaction signals associated with each segment of the set of segments
320

Assign a salience score to each segment based on the analysis of the user interaction signals, where a higher score corresponds to higher salience of the segment
330

Extract audio-visual content feature values from each of the segments
340

Train a ranking model using the audio-visual content features to generate a function that predicts the assigned salience scores
350

Return a function of the trained ranking model that uses audio-visual content feature values of a video segment as input to generate a salience score for the segment
360

FIG. 3

400 

```
┌─────────────────────────────────────────────────────────────────────┐
│ Receive a function of a trained ranking model for predicting salience scores for │
│                            a video segment                           │
│                                                                 410 │
└─────────────────────────────────────────────────────────────────────┘
                                    ▼
┌─────────────────────────────────────────────────────────────────────┐
│                   Receive a target video for auto-play              │
│                                                                 420 │
└─────────────────────────────────────────────────────────────────────┘
                                    ▼
┌─────────────────────────────────────────────────────────────────────┐
│                   Divide target video into video segments           │
│                                                                 430 │
└─────────────────────────────────────────────────────────────────────┘
                                    ▼
┌─────────────────────────────────────────────────────────────────────┐
│        Extract audio-visual content feature values from each video segment │
│                                                                 440 │
└─────────────────────────────────────────────────────────────────────┘
                                    ▼
┌─────────────────────────────────────────────────────────────────────┐
│ Apply received function to each video segment using the extracted audio-visual │
│              content feature values as input for the function       │
│                                                                 450 │
└─────────────────────────────────────────────────────────────────────┘
                                    ▼
┌─────────────────────────────────────────────────────────────────────┐
│   Calculate salience score for each video segment based on application of the │
│                            received function                         │
│                                                                 460 │
└─────────────────────────────────────────────────────────────────────┘
                                    ▼
┌─────────────────────────────────────────────────────────────────────┐
│   Select one of the video segments based on the calculated salience scores for │
│                            the video segments                        │
│                                                                 470 │
└─────────────────────────────────────────────────────────────────────┘
                                    ▼
┌─────────────────────────────────────────────────────────────────────┐
│  Auto-play target video using the selected video segment as the starting point │
│                            for the target video                      │
│                                                                 480 │
└─────────────────────────────────────────────────────────────────────┘
```

PREDICTING VIDEO START TIMES FOR MAXIMIZING USER ENGAGEMENT

TECHNICAL FIELD

This disclosure relates to the field of content sharing platforms and, in particular, to predicting video start times for maximizing user engagement.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such viewable and shareable media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers, network-connected televisions) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes applying a machine-learned model to audio-visual content features of segments of a target content item, the machine-learned model trained based on user interaction signals and audio-visual content features of a training set of content item segments, calculating, based on applying the machine-learned model, a salience score for each of the segments of the target content item, and selecting, based on the calculated salience scores, one of the segments of the target content item as a starting point for playback of the target content item.

In one implementation, the user interaction signals include at least one of scrubbing in the content item segments, seeking to the content item segments, sharing at a timestamp of the content item segments, or quitting at a timestamp of the content item segments. In another implementation, the audio-visual content features include at least one of low-level color features, low-level texture features, semantic embedding features, audio volume levels, or annotations from classifiers training on audio-visual vocabularies.

Furthermore, each content item segment of the training set may be assigned an assumed salience score based on the user interaction signals corresponding to the content item segment. In addition, the machine-learned model may be trained by generating a function that predicts the assumed salience score for the content item segment using the audio-visual content features of the content item segment as inputs to the function. In some implementations, the machine-learned model is a pairwise ranking model.

In a further implementation, the playback of the target content item includes auto-play of the target content item via starting the playback of the target content item at the selected one of the segments without any user intervention. In addition, the target content item may be a video. Furthermore, selecting the one of the segments in the method may further be based on one or more logic rules limiting where the playback of the target content item is to begin. In another implementation, additional user interaction signals corresponding to the playback of the target content item may be used as feedback to training the machine-learned model.

In an additional implementation, calculating the salience score for each of the segments of the target content item in the method further includes receiving the target content item for the playback, dividing the target content item into the segments, extracting values corresponding to audio-visual content features from each of the segments, inputting, for each of the segments, the extracted values corresponding to the audio-visual content features from the segment to a function of the machine-learned model, and receiving, from the function for each of the segments, a calculated salience score for the segment.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

FIG. 3 is a flow diagram illustrating a method for training a salience model for predicting video start times for maximizing user engagement, according to an implementation.

FIG. 4 is a flow diagram illustrating a method for selecting a starting segment for auto-play based on a predicted salient video start times, according to an implementation.

DETAILED DESCRIPTION

Aspects and implementations of the disclosure are directed to predicting video start times for maximizing user engagement. Implementations are described for enabling automatic identification of salient segments of a video by using a combination of user interaction analytics and video content analysis. A salient segment (e.g., clip, portion, point) may refer to a noticeable, important, relevant, and/or interesting segment of the video. These identified salient segments may then be used as starting points from which to auto-play the video. Auto-play refers to starting playback of a video without any user interaction.

In order to identify a salient segment of a video, implementations of the disclosure may use a combination of analysis of previous user interactions with the video and computational analysis of audio/video content features of the video. In one implementation, a machine-learned model is built (i.e., trained) and utilized to identify the salient segments of videos.

Auto-play is a popular means for consuming videos on mobile interfaces. Most auto-play experiences start from the beginning of the video, where there is often non-salient content (e.g., title screen, setup), whereas most of the salient portions of the video may be further into playback of the video. Users often have very limited time in which they decide whether to consume a video. Spending this time in the non-salient portions of the video is not optimal. Prior solutions typically do not offer a preview of what is salient (e.g., exciting, relevant, and/or interesting) in a video as part of an auto-play experience.

Implementations of the disclosure overcome the limitations of the prior solutions for predicting video start times for maximizing user engagement by providing automatic identification of salient segments of a video by using a combination of user interaction analytics and video content analysis. These identified interesting segments may then be used as starting points from which to auto-play the video in order to persuade a user to watch the whole video. This significantly improves the user's experience with auto-play and also improves overall engagement with videos on the content sharing platform. In addition, implementations of the disclosure lower the "work" a user has to do when deciding whether to watch a video. The user is saved time spent on a video, which could mean allowing the user to explore a larger part of the video corpus of the content sharing platform, improving the user's engagement with content of the content sharing platform, and improving overall experience and perception of the content sharing platform.

Implementations of the disclosure often reference videos for simplicity and brevity. However, the teachings of the disclosure are applied to media items generally and can be applied to various types of content or media items, including for example, video, audio, text, images, program instructions, etc.

Figure 1:
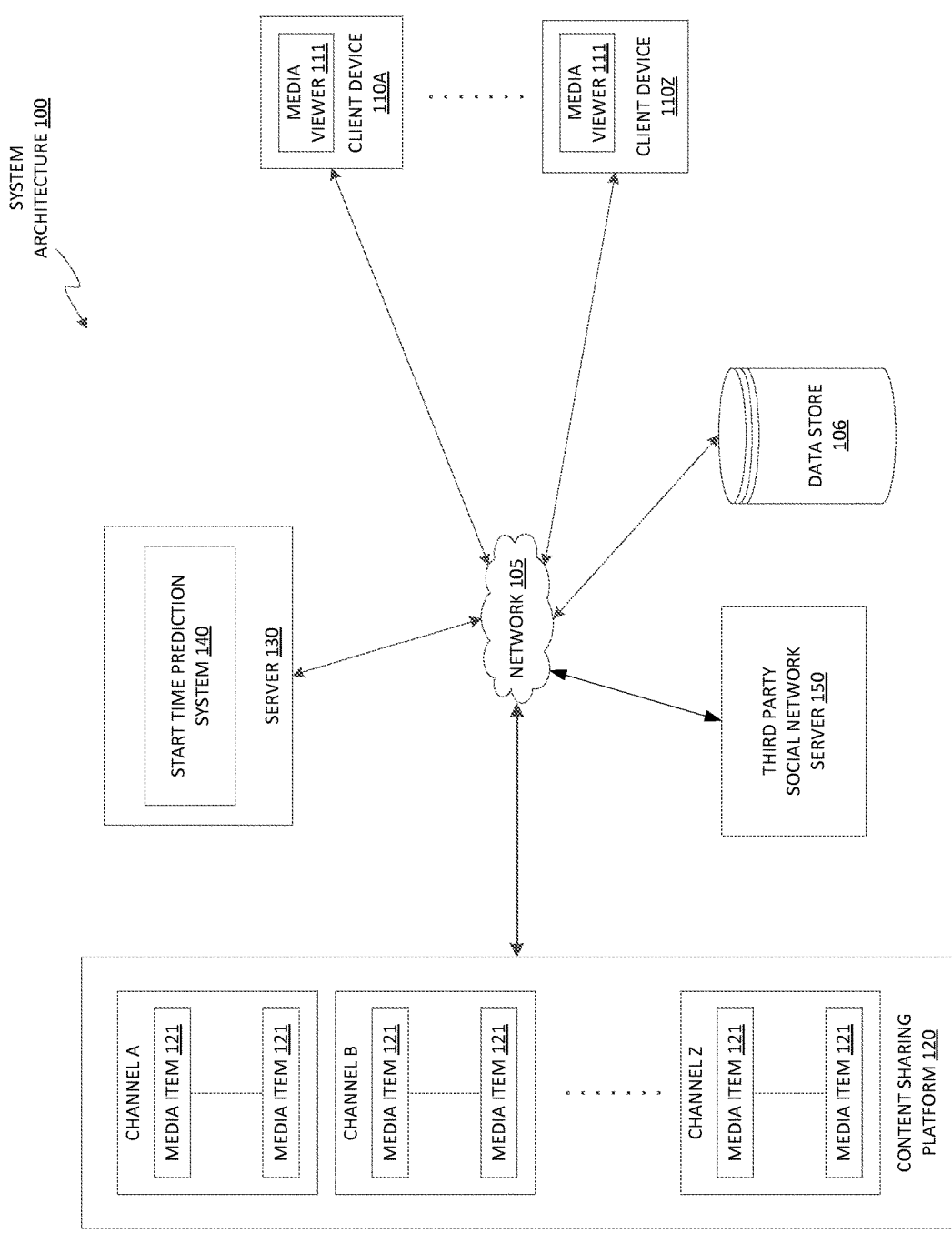
FIG. 1 is a block diagram illustrating an exemplary network architecture in which implementations of the present disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed to. Syndicated feeds may also include content items from channels that the user is not subscribed to. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a start time prediction system 140. In one implementation, the start time prediction system 140 enables automatic identification of salient segments of a video by using a combination of user interaction analytics and video content analysis. A salient segment (e.g., clip, portion, point) may refer to a noticeable, important, relevant, and/or interesting segment of the video based on general user interactions on the content sharing platform with the video. These identified salient segments may then be used as starting points from which to auto-play the video. Auto-play refers to the act of starting playback of a video without any user interaction. Auto-playing a video from a salient segment can significantly improve a user's experience with auto-play and also improve overall engagement with videos on the content sharing platform. Implementations of the disclosure are not limited to the auto-play context, and may encompass utilizing predicted salient segments of videos for start times in other contexts than auto-play.

In order to identify a salient segment of a video, implementations of the disclosure may use a combination of analysis of previous user interactions with the video and computational analysis of audio/video content features of the video. In one implementation, a machine-learned model is built (i.e., trained) and utilized to identify the salient segments of videos.

In some implementations, start time prediction system 140 of server 130 may interact with content sharing platform 120 and/or with other third party social network servers 150 to provide implementations of the disclosure. Further description of the start time prediction system 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
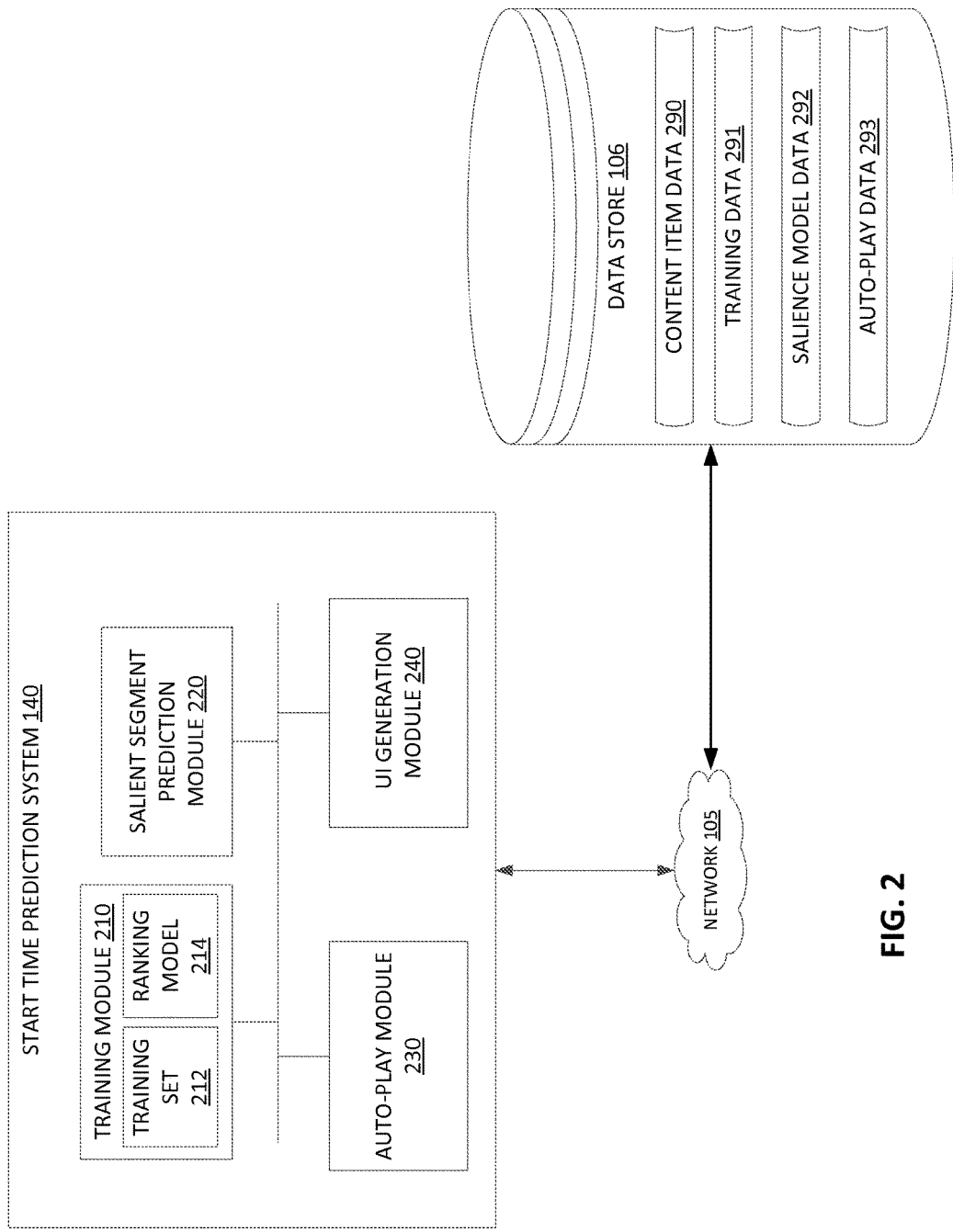
FIG. 2 is a block diagram illustrating a start time prediction system in accordance with one implementation of the disclosure.

FIG. 2 is a block diagram illustrating a start time prediction system 140 in accordance with one implementation of the disclosure. As discussed above, the start time prediction system 140 may interact with a single social network, or may be utilized among multiple social networks (e.g., provided as a service of a content sharing platform that is utilized by other third party social networks). In one implementation, the start time prediction system 140 includes a training module 210, a salient segment prediction module 220, an auto-play module 230, and a UI generation module 240. More or less components may be included in the start time prediction system 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The start time prediction system 140 is communicatively coupled to the data store 106. For example, the start time prediction system 140 may be coupled to the data store 106 via a network (e.g., via network 105 as illustrated in FIG. 1). In another example, the start time prediction system 140 may be coupled directly to a server where the start time prediction system 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, training data 291, salience model data 292, and auto-play data 293.

As discussed above, the start time prediction system 140 enables automatic identification of salient segments of a video by using a combination of user interaction analytics and video content analysis. A salient segment (e.g., clip, portion, point) may refer to a noticeable, important, relevant, and/or interesting segment of the video. These identified salient segments may then be used as starting points from which to auto-play the video. Auto-play refers to the act of starting playback of a video without any user interaction. Auto-playing a video from a salient segment can significantly improve a user's experience with auto-play and also improve overall engagement with videos on the content sharing platform.

In order to identify a salient segment of video, the start time prediction module 140 may use a combination of analysis of how users have previously interacted with the video and computational analysis of audio/video content features of the video. In one implementation, the training module 210 builds a machine-learned model to identify salient segments of videos.

To build the machine-learned model, the training module 210 first identifies a training set 212 of video segments (segments may also be referred to as clips, portions, or snippets herein). In one implementation, the length of the video segments may vary from one segment to another, and may be based on natural segmentation with the video, such as scene changes, narration changes, and so on. In other implementations, the video segments are each of a uniform duration. Video segments may be obtained from content item data 290 stored in data store 106.

The training module 210 may utilize user interaction signals for the training set 212 and attach assumed salience values to the video segments from the training set 212. User interaction signals may include both active and passive user interaction signals. Active user interaction signals may include, but are not limited to, scrubbing (e.g., manually moving forward or backward through the video via interaction with a scrollbar) in a segment, seeking to the segment, and sharing at a particular timestamp that is in a segment. Passive user interaction signals may include, but are not limited to, quitting at a particular timestamp that is in a segment (also referred to as audience retention statistic).

The user interaction signals corresponding to each video segment may be used by the training module 210 to associate a salience value (or salience score) to the video segment. For example, the user interaction signal of the audience retention statistic may be used to assign to each video segment of the training set 212 a salience score corresponding to the retention of audience relative to other similar videos. If the score is "high", it is indicative of a salient segment of a video. The training set 212 and associated salience scores may be stored as training data 291 in data store 106.

In some implementations, data other than user interaction signals is relied upon to predict a salience of a video segment for the training set 212. For example, a frequency of upload of a segment of a movie can be used to infer that this portion of the movie is a more interesting (i.e., more salient) segment of the movie. In other implementations, creation of Graphics Interchange Format images (GIFs) (or other images) from a segment of video can indicate that the segment is an interesting (e.g., salient) portion of the video. In some implementations, more than one user interaction signal or other signal data is used for the training set 212 corresponding salience scores of video segments from the training set 212.

Once a training set 212 is identified, a ranking module 214 is trained using audio-visual content features extracted from the video segments along with the salience scores corresponding to the segments. The audio-visual content features may include, but are not limited to, low-level color and texture features, semantic embedding features, audio volume levels, and annotations from classifiers training on audio-visual vocabularies. In one implementation, the ranking module 214 is a pairwise ranking model. In the pairwise ranking model, it is assumed that the saliency (clip A) >saliency (clip B). Then, a salience score function is learned so that when a feature vector of audio-visual content features from clip A is used as input to the salience score function, a salience score is generated that is higher than a salience score generated from the function with the feature vector from clip B used as input.

The end result of the training by training module 210 is to create a function that can predict a salience score for any segment of a content item that is inputted into the function. The function of the trained model may be stored as salience model data 292 of data store 106.

The salient segment prediction module 220 of start time prediction system 140 may apply the function learned from training module 210 to determine one or more salient segments of a target video (also referred to herein as a target content item). In one implementation, the target video is the result of a search query or a browsing session. In another implementation, the target video is part of a playlist or other set of content items presented to a user of the content sharing platform. The salient segment prediction module 220 may temporally segment a target video into clips or segments. As discussed above, the segments may correspond to natural breaks within the video and may vary in length. In other implementations, the segments may be of a uniform length.

The salient segment prediction module 220 may then apply the function of the trained model to each of the generated segments of the video to obtain a predicted salience score for each segment. In one implementation, an audio/visual feature vector is extracted from each segment and used as the input to the function to generate the salience score for the segment.

In some implementations, a relevance score indicating relevance of a segment to user context (e.g. query) can also be incorporated into the predicted salience scoring performed by salient segment prediction module 220. For example, if a user searches for a particular term, such as "giraffe", the salient segment prediction module 220 may use metadata associated with each segment to identify those segments corresponding to giraffes as candidates for selection (as opposed to selecting the highest overall salience score clip, which may have some other animals in it).

The auto-play module 230 may then utilize the salience scores predicted for each segment of the target video by the salient segment prediction module 220 in order to select a segment from which to automatically start playback of the target video. The UI generation module 240 may then provide data to a client device in order to render a UI that auto-plays the target video from the selected segment.

In one implementation, the auto-play module 230 may select the segment with the highest salience score to start auto-playback of the target video. In other implementations, the auto-play module 230 may identify the top X number or top X percentage of the target video segments in terms of predicted salience score, and then select one of these segments (e.g., randomly or otherwise) to start auto-playback of the target video. In some implementations, other selection logic may be applied by the auto-play module 230, such as not skipping more than X % of the video. For example, if the most salient segment occurs at the 60% mark, and the additional selection logic indicates that more than 50% of the video should not be skipped, then the selection logic of the auto-play module 230 dictates that the most salient segment starting at <=50% of the video length should be selected.

The segment selected for auto-playback of the target video, as well as feedback (e.g., did users quit during segment, did users scrub in segment, did users share during the segment, etc.) associated with auto-playing the target video from the selected segment may be stored in auto-play data 293 of data store 106. In one implementation, the feedback from user interactions with an auto-played segment selected based on predicted salience score can be used to inform training of the machine-learned model by training module 210.

By selecting a high-scoring salience video segment to auto-start playback of a target video, a user may be more likely to enjoy the segment of the video and continue watching the target video for longer than if the user had started watching the target video from the beginning. In some implementations, the user is also offered an option to start playback of the target video from the beginning of the video in the event that the user anticipates that he or she may enjoy watching the entire video.

FIG. 3 is a flow diagram illustrating a method 300 for training a salience model for predicting salient video start times for maximizing user engagement, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by start time prediction system 140 as shown in FIGS. 1 and 2.

Method 300 begins at block 310 when a set of segments from one or more videos of a content sharing platform are extracted. Then, at block 320, user interaction signals associated with each segment are analyzed. At block 330, a salience score is assigned to each segment based on the analysis of the user interaction signals. In one implementation, a higher salience score corresponds to a higher salience of the segment.

Subsequently, at block 340, audio-visual content feature values are extracted from each of the segments. Then, at block 350, a ranking model is trained using the audio-visual content features in order to generate a function that predicts that assigned salience score corresponding to each segment. Lastly, at block 360, a function of the trained ranking model is returned. The function can be subsequently used to assign ranking scores to segments of other videos. In particular, the function can use the audio-visual content feature values of a video segment as input to generate a predicted salience score for the segment.

FIG. 4 is a flow diagram illustrating a method 400 for selecting a starting segment for auto-play based on a predicted video start times, according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by start time prediction system 140 as shown in FIGS. 1 and 2.

Method 400 begins at block 410 when a function of a trained ranking model is received for predicting salience scores for a video segment. At block 420, a target video is received for auto-play. Then, at block 430, the target video is divided into segments. At block 440, audio-visual content feature values are extracted from each video segment.

Subsequently, at block 450, the received function is applied to each video segment using the extracted audio-visual content feature values as input for the function. At block 460, a salience score is calculated for each video segment based on the application of the received function to the video segment. At block 470, one of the video segments is selected based on the calculated salience scores for the video segments. In one implementation, the video segment with a predicted salience score that indicates high saliency of the video segment is selected for auto-play. Lastly, at block 480, the target video is auto-played using the selected video segment as the starting point for the auto-play of the target video.

Figure 5:
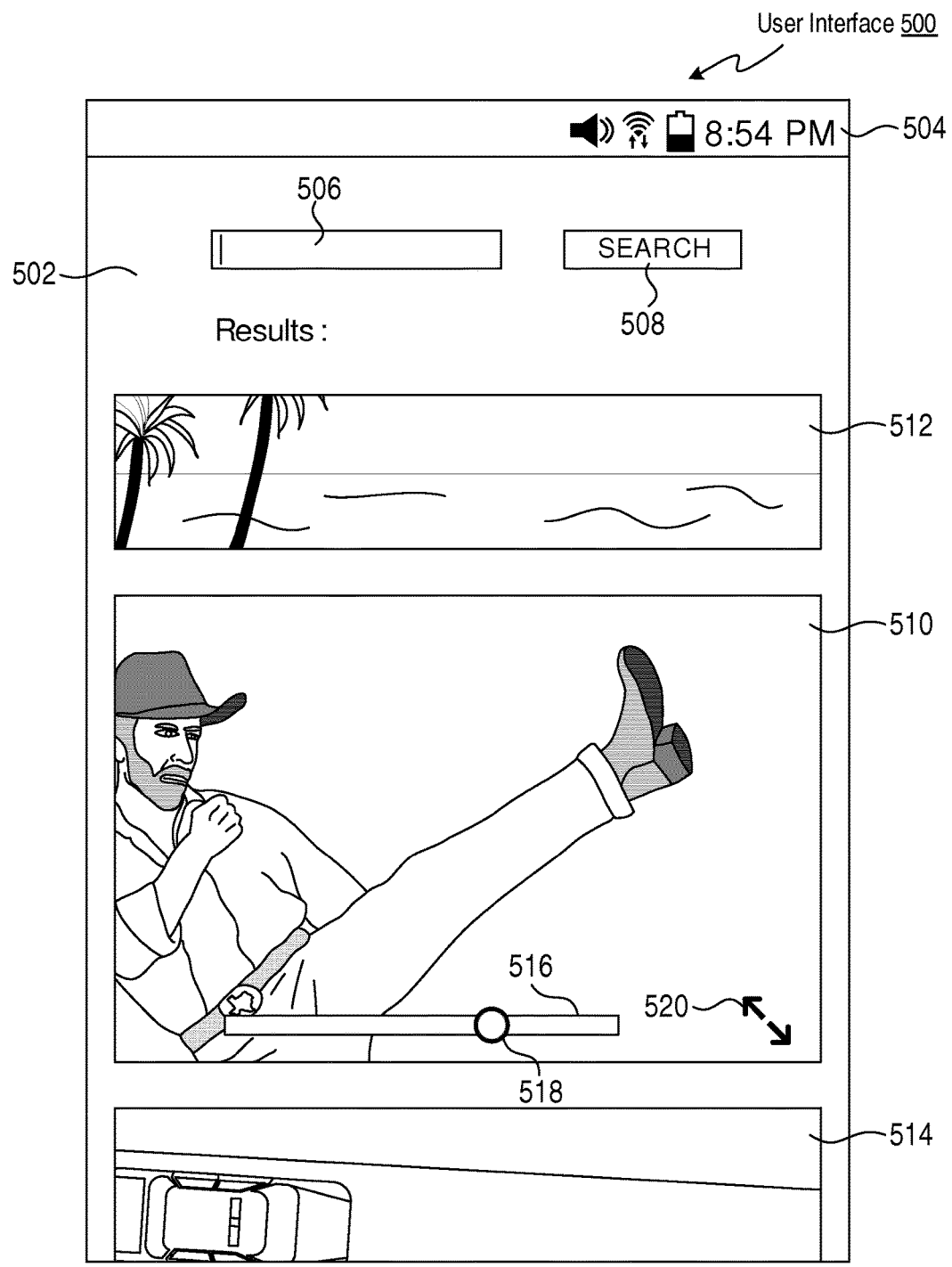
FIG. 5 illustrates an example screenshot of a user interface (UI) presenting a continuous content stream using auto-play from predictive salient video start times, according to implementations of the disclosure

FIG. 5 illustrates an example user interface 500 presenting a continuous content stream using auto-play from predicted salient video start times in accordance with an implementation of the disclosure. For example, the user interface 500 may be provided via one of the respective media viewers 111 of the client devices 110A-110Z. In one implementation, UI generation module 240 described with respect to FIG. 2 provides the data used to render user interface 500.

The user interface 500 includes a main region 502 (e.g., for displaying content) and a header region 504 (for displaying device information, etc.). The main region 502 includes a search box 506 for entering a search string, and a search button 508 that causes a search request for text entered into the search box 506 to be transmitted to a search engine. Content items 510, 512, and 514 may be returned as search results. In some implementations, the search aspect is omitted, and the user interface 500 may present content to a user (e.g., content items 510, 512, 514, and others not shown), for example, based on user preferences and user-specific content recommendations without requiring a user to request or select the content.

In one implementation, the content item 510 corresponds to a current content item that is being played by a client device implementing the user interface 500. The content item 510 may be a video. In some implementations, a playback bar 516 with a corresponding playback indicator 518 may be displayed (e.g., overlaid on the content item 510, adjacent to the content item 510, etc.). A full-screen option 520 may also be displayed, which, when selected, causes the content item 510 to fitted to the dimensions of the user interface 500. The content item 512 may correspond to a content item that was previously played by the client device, partially played by the client device, or scheduled for playback but skipped (e.g., in response to the user advancing forward through a list of scheduled content items). The content item 514 may correspond to a next content item to be played.

In some implementations, if the user interface 500 is implementing a continuous content stream, each content item is auto-played in a sequential fashion. For example, once the content item 512 ends (e.g., as a result of reaching an end of the content playback, in response to receiving a user input to advance/skip the content, etc.), the content item 510 then becomes the current content item being played by the client device without any user interaction. In one implementation, each content item 510, 512, 514 begins its auto-play from a video segment in the video selected based on a predicted salience score of the segment. For example, the start time for the auto-play of a content item 510, 512, 514 may be selected according to method 400 described with respect to FIG. 4.

The content items 512 and 510 may appear to scroll up (and the content item 512 may be cropped depending on the dimensions of the user interface 500) such that the content item 510 appears at or near the center of the main region 502. The content item 514 may also appear in the main region (e.g., and may be cropped) as a result of the scrolling up of the content items 512 and 510. In some implementations, the user of the client device may control the playback of content items. For example, scrolling (up or down) may occur in response to a user input (e.g., scrolling using a mouse, a "finger swipe" if the client device has touch-screen capabilities, a voice command, etc.).

Prior to commencement of playback of the content item 510, the content item 510 may have been represented as a static image (e.g., a representative frame from video of the content item 510, a title screen of the content item 510, etc.). In some implementations, the content item 510 may have been presented as a video. For example, the video may be muted (e.g., so as to not interfere with audio from the current content item), and may correspond to playback of highlights of the content (e.g., one or more designated interesting portions of the content item based on, for example, annotation data associated with the content item 510) or a live feed of the content item (e.g., if the content item 510 is a live content item).

Once playback of the content item 510 has commenced, the content item 512 may be displayed as a static image or as a video (e.g., as described above with respect to the content item 510). Similarly, the content item 514 (the next content item) may be displayed in a similar fashion. Once playback of the content item 510 (the current content item) ends, the content items 510, 512, and 514 may scroll up within the main region 502.

Figure 6:
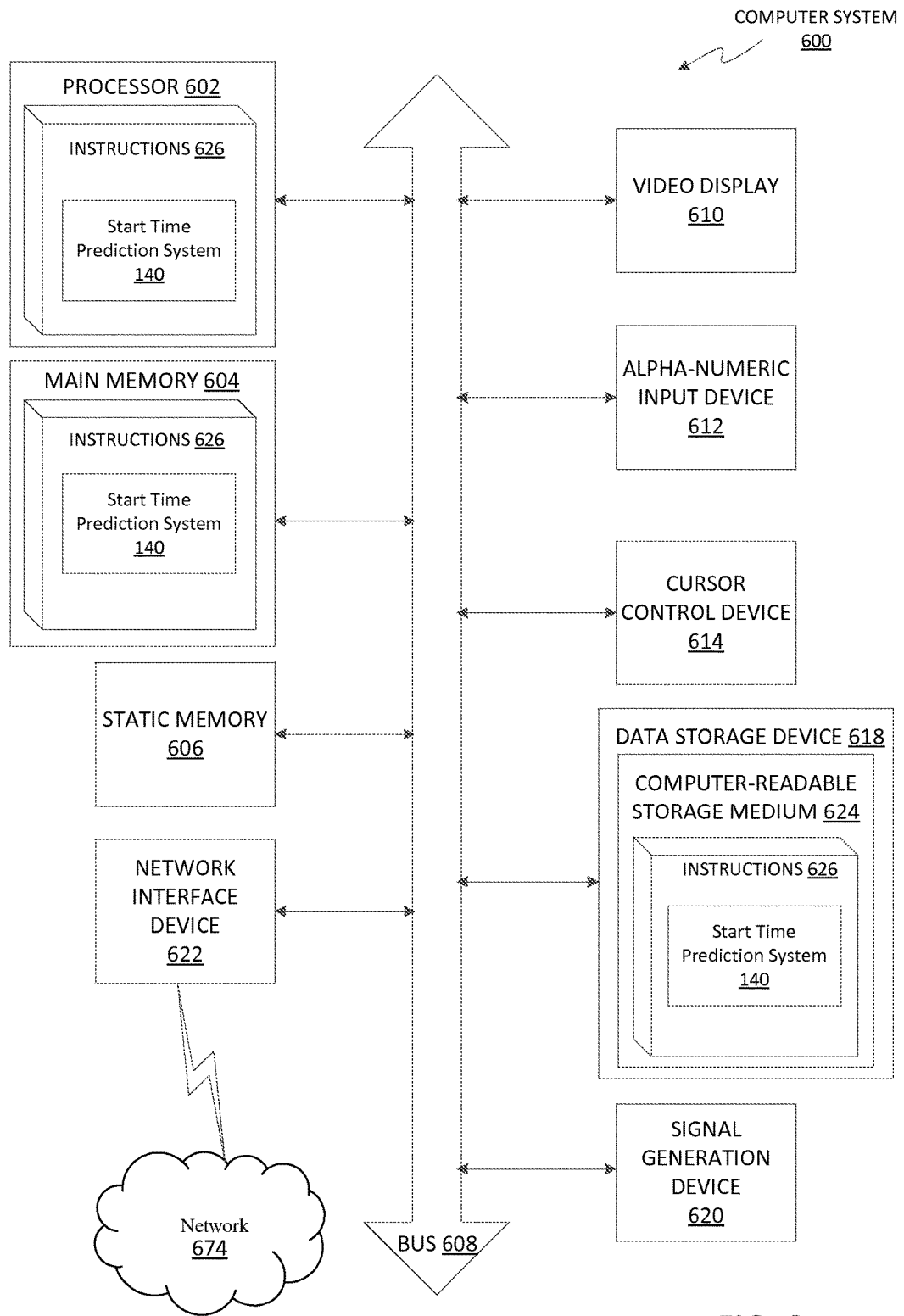
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server, such as server 102, executing a start time prediction system 140, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 (also referred to as a machine-readable storage medium), on which is stored one or more set of instructions 626 (e.g., software) embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting machine-readable storage media. The instructions 626 may further be transmitted or received over a network 674 via the network interface device 622.

The computer-readable storage medium 624 may also be used to store instructions to perform a method for predicting video start times for maximizing user engagement, as described herein. While the computer-readable storage medium 624 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
applying, by a processing device, a machine-learned model to audio-visual content features of first content item segments of a first content item, the machine-learned model trained based on user interaction signals and audio-visual content features of a training set of training segments of training content items, wherein the user interaction signals comprise scrubbing in the training segments;
calculating, based on applying the machine-learned model, a salience score for each of the first segments of the first content item; and
selecting, based on the calculated salience scores, one of the first content item segments as a starting point for playback of the first content item.

2. The method of claim 1, wherein the user interaction signals further comprise at least one of seeking to the training segments, sharing at a timestamp of the training segments, or quitting at a timestamp of the training segments.

3. The method of claim 1, wherein the audio-visual content features further comprise at least one of low-level color features, low-level texture features, semantic embedding features, audio volume levels, or annotations from classifiers training on audio-visual vocabularies.

4. The method of claim 1, wherein each of the training segments of the training set is assigned an assumed salience score based on the user interaction signals corresponding to the training segment.

5. The method of claim 4, wherein, for each of the training segments, the machine-learned model is trained by generating a function that predicts the assumed salience score for the training segment using the audio-visual content features of the training segment as inputs to the function.

6. The method of claim 1, wherein the machine-learned model is a pairwise ranking model.

7. The method of claim 1, wherein the playback of the first content item comprises auto-play of the first content item via starting the playback of the first content item at the selected one of the first content item segments without any user intervention.

8. The method of claim 1, wherein the first content item is a video.

9. The method of claim 1, wherein selecting the one of the first content item segments is further based on one or more logic rules limiting where the playback of the first content item is to begin.

10. The method of claim 1, wherein additional user interaction signals corresponding to the playback of the first content item are used as feedback to training the machine-learned model.

11. The method of claim 1, wherein calculating the salience score for each of the first content item segments of further comprises:
receiving the first content item for the playback;
dividing the first content item into the segments;
extracting values corresponding to audio-visual content features from each of the first content item segments;
inputting, for each of the first content item segments, the extracted values corresponding to the audio-visual content features from the first content item segment to a function of the machine-learned model; and
receiving, from the function for each of the first content item segments, a calculated salience score for the first content item segment.

12. A client device comprising:
a display device;
a memory; and
a processing device communicably coupled to the display device and the memory, wherein the processing device is to:
provide, via a user interface (UI) rendered on the display device, a first content item for playback;
receive identification of a content item segment of the first content item, the identified content item segment determined based on a salience score of the identified content item segment that is calculated using a machine-learned model trained on user interaction signals and audio-visual content features of a training set of training content item segments, wherein the user interaction signals comprise scrubbing in the training content item segments; and
playback, via the UI, the first content item from a starting point of the identified content item segment.

13. The client device of claim 12, wherein the user interaction signals further comprise at least one of seeking to the training content item segments, sharing at a timestamp of the training content item segments, or quitting at a timestamp of the training content item segments.

14. The client device of claim 12, wherein the audio-visual content features further comprise at least one of low-level color features, low-level texture features, semantic embedding features, audio volume levels, or annotations from classifiers training on audio-visual vocabularies.

15. The client device of claim 12, wherein each training content item segment of the training set is assigned an assumed salience score based on the user interaction signals corresponding to the training content item segment, and wherein the machine-learned model is trained by generating a function that predicts the assumed salience score for the training content item segment using the audio-visual content features of the training content item segment as inputs to the function.

16. The client device of claim 12, wherein the playback of the first content item comprises auto-play of the first content item via starting the playback of the first content item at the starting point of the identified content item segment without any user intervention.

17. A non-transitory machine-readable storage medium storing instructions which, when executed, cause a processing device to perform operations comprising:
applying, by the processing device, a machine-learned model to audio-visual content features of first content item segments of a first content item, the machine-learned model trained based on user interaction signals and audio-visual content features of a training set of training segments of training content items, wherein the user interaction signals comprise scrubbing in the training segments;
calculating, based on applying the machine-learned model, a salience score for each of the first content item segments of the first content item; and
selecting, based on the calculated salience scores, one of the first content item segments of the first content item as a starting point for playback of the first content item.

18. The non-transitory machine-readable storage medium of claim 17, wherein the user interaction signals further comprise at least one of seeking to the training segments, sharing at a timestamp of the training segments, or quitting at a timestamp of the training segments.

19. The non-transitory machine-readable storage medium of claim 17, wherein the audio-visual content features comprise at least one of low-level color features, low-level texture features, semantic embedding features, audio volume levels, or annotations from classifiers training on audio-visual vocabularies.

20. The non-transitory machine-readable storage medium of claim 17, wherein each training segment of the training set is assigned an assumed salience score based on the user interaction signals corresponding to the training segment, and wherein the machine-learned model is trained by generating a function that predicts the assumed salience score for the training segment using the audio-visual content features of the training segment as inputs to the function.

21. The non-transitory machine-readable storage medium of claim 17, wherein the playback of the first content item comprises auto-play of the first content item via starting the playback of the first content item at the selected one of the first content item segments without any user intervention.

22. The non-transitory machine-readable storage medium of claim 17, wherein calculating the salience score for each of the first content item segments of the first content item further comprises:
receiving the first content item for the playback;
dividing the first content item into the first content item segments;
extracting values corresponding to audio-visual content features from each of the first content item segments;
inputting, for each of the first content item segments, the extracted values corresponding to the audio-visual content features from the first content item segment to a function of the machine-learned model; and
receiving, from the function for each of the first content item segments, a calculated salience score for the first content item segment.

* * * * *